(No Model.)
W. H. COOPER.
PERCH BEARING FOR FIFTH WHEELS.
No. 409,561. Patented Aug. 20, 1889.
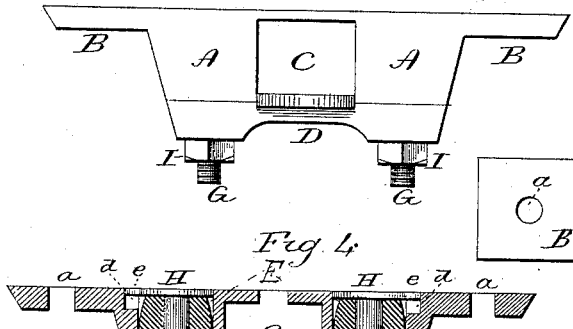
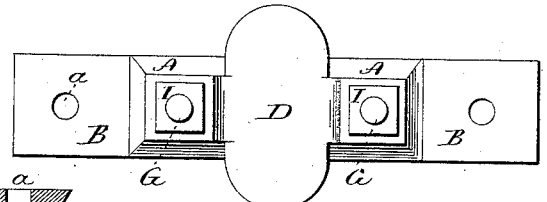
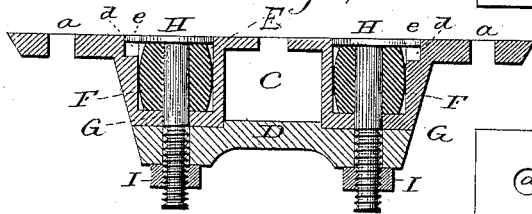
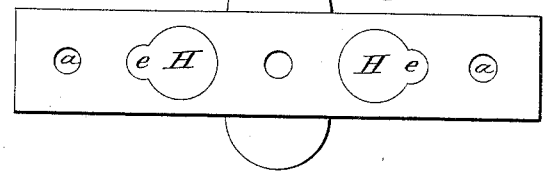
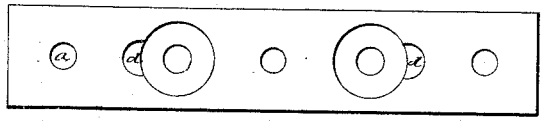
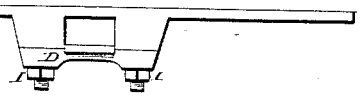
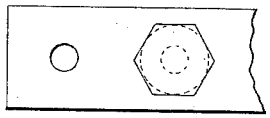
Witnesses
J. H. Shumway
Fred C. Earle
William H. Cooper
Inventor
By Atty.

UNITED STATES PATENT OFFICE.

WILLIAM H. COOPER, OF NEW HAVEN, CONNECTICUT, ASSIGNOR TO M. SEWARD & SON, OF SAME PLACE.

PERCH-BEARING FOR FIFTH-WHEELS.

SPECIFICATION forming part of Letters Patent No. 409,561, dated August 20, 1889.

Application filed January 21, 1889. Serial No. 297,001. (No model.)

*To all whom it may concern:*

Be it known that I, WILLIAM H. COOPER, of New Haven, in the county of New Haven and State of Connecticut, have invented a new Improvement in Perch-Bearings for Fifth-Wheels; and I do hereby declare the following, when taken in connection with accompanying drawings, and the letters of reference marked thereon, to be a full, clear, and exact description of the same, and which said drawings constitute part of this specification, and represent, in—

Figure 1, a side view of the bearing complete; Fig. 2, a top or perch side view of the same; Fig. 3, an under side view of the same; Fig. 4, a vertical longitudinal central section; Fig. 5, an under perch side view of the body, the screws and springs removed; Fig. 6, a perspective view of one of the screws detached; Fig. 7, the bearing formed as a part of a perch-plate; Fig. 8, a modification in the formation of the head of the screw and corresponding portion of the spring-chamber.

This invention relates to an improvement in the bearing or support applied to the perch of a carriage to guide and hold the fifth-wheel in its proper position, the object of the invention being a simple construction, which may be readily applied directly to the perch, and allow a sufficient freedom for the working of the fifth-wheel, yet preventing its rattling; and it consists in the construction as hereinafter described, and particularly recited in the claim.

A represents the body of the bearing, which is constructed with projecting ears B, by which it may be secured to the perch by screws or bolts through suitable holes $a$ formed in the ears. Transversely through the base is a recess C, which corresponds in width to the width of the fifth-wheel, and in depth substantially that of the fifth-wheel.

D represents the pressure-bar, which corresponds in shape to the shape of the recessed side of the body A and so as to extend across the recess C and bear upon that side of the fifth-wheel. The bar D is yieldingly held upon the body. To accomplish this yielding character of the bar D, the base A is constructed with vertical chambers E upon the side opposite the bar—that is, the perch side of the bearing—one chamber formed in the body each side the opening C, as seen in Figs. 4 and 5. Into these chambers E a spring F, preferably made of india-rubber, is introduced, and through the springs a screw G is introduced, the screws having heads H of a shape corresponding to the spring-chambers. The screws extend through the springs, through the body, and through the bar D, and, projecting therefrom, a nut I is applied to each screw so as to bear upon the bar, and as the nut is turned to a greater or less extent the spring F is correspondingly compressed in its chamber, so that the power by which the bar D is held upon the body is that of the springs F, and may be adjusted to be greater or less, as occasion requires.

It is necessary to prevent the screws from revolving, so that the nut may be adjusted at pleasure after the bearing has been applied to the perch. Such application of the bearing covers the head of the screws, so that they are out of reach. To accomplish this object a recess $d$ is made in the wall of each chamber, as seen in Figs. 4 and 5, and the head of each screw is constructed with a corresponding projecting tongue $e$, (see Fig. 6,) which will set into the said recess $d$, these recesses being of greater depth than the thickness of the tongue $d$, and so that a considerable adjustable movement may be permitted the heads of the screws to compress the springs to a greater or less extent. This bearing may be applied to either the upper or lower side of the perch, as occasion may require; but it is usually upon the under side, and the illustrations represent the bearing as in that position. The fifth-wheel works through the recess C and so as to be guided thereby, the bar D resting upon one side of the fifth-wheel, while the wheel itself takes a bearing in the bottom of the recess C. Owing to the fact that the bar D through the spring F is yielding, the pressure of the bar upon the fifth-wheel is correspondingly yielding, so that while it will hold the fifth-wheel and prevent its rattling it will not interfere with its movement.

Instead of making the bearing as an independent piece, to be attached directly to the perch, it may be as a part of the perch-plate, and thereby be directly attached to the perch. Such modification is represented in Fig. 7. The construction, however, is the same in either case.

Instead of making the engagement between the heads of the screws and the walls of the chamber by a tongue on the head projecting into a recess, as described, any irregular or non-cylindrical shape of the head and corresponding shape of the adjacent portion of the spring-chamber will serve to prevent the rotation of the screws—say as seen in Fig. 8, where the head is represented of hexagonal shape, and the adjacent portion of the spring-chamber made of corresponding shape.

I do not claim, broadly, a perch-bearing for fifth-wheels in which a recess is formed for the fifth-wheel, with a spring upon opposite sides of the recess and a bar over the recess, with bolts through the springs and said bar, as such, I am aware, is not new.

I claim—

The herein-described perch-bearing for fifth-wheels, consisting of the body A, constructed for attachment directly to the perch, the body also constructed with a transverse recess C, with a vertical chamber E opening from the perch side of the body into the body each side the said recess C, combined with a bar D on the side of the body opposite the perch and extending across the recess C, a spring F in each of said chambers of the body, screw G, extending through said springs and through the bar, the said screws constructed with a head of non-cylindrical shape, larger in area than the said spring-chambers, the spring-chambers constructed with a recess at their open end corresponding to the shape of the said heads, and in which the said heads will rest, with a nut on said screw adapted to bear upon said bar, substantially as described.

WILLIAM H. COOPER.

Witnesses:
FRED C. EARLE,
J. H. SHUMWAY.